C. T. CROCKER.
ART OF PAPER MAKING.
APPLICATION FILED OCT. 21, 1918.
1,326,849.
Patented Dec. 30, 1919.
5 SHEETS—SHEET 1.
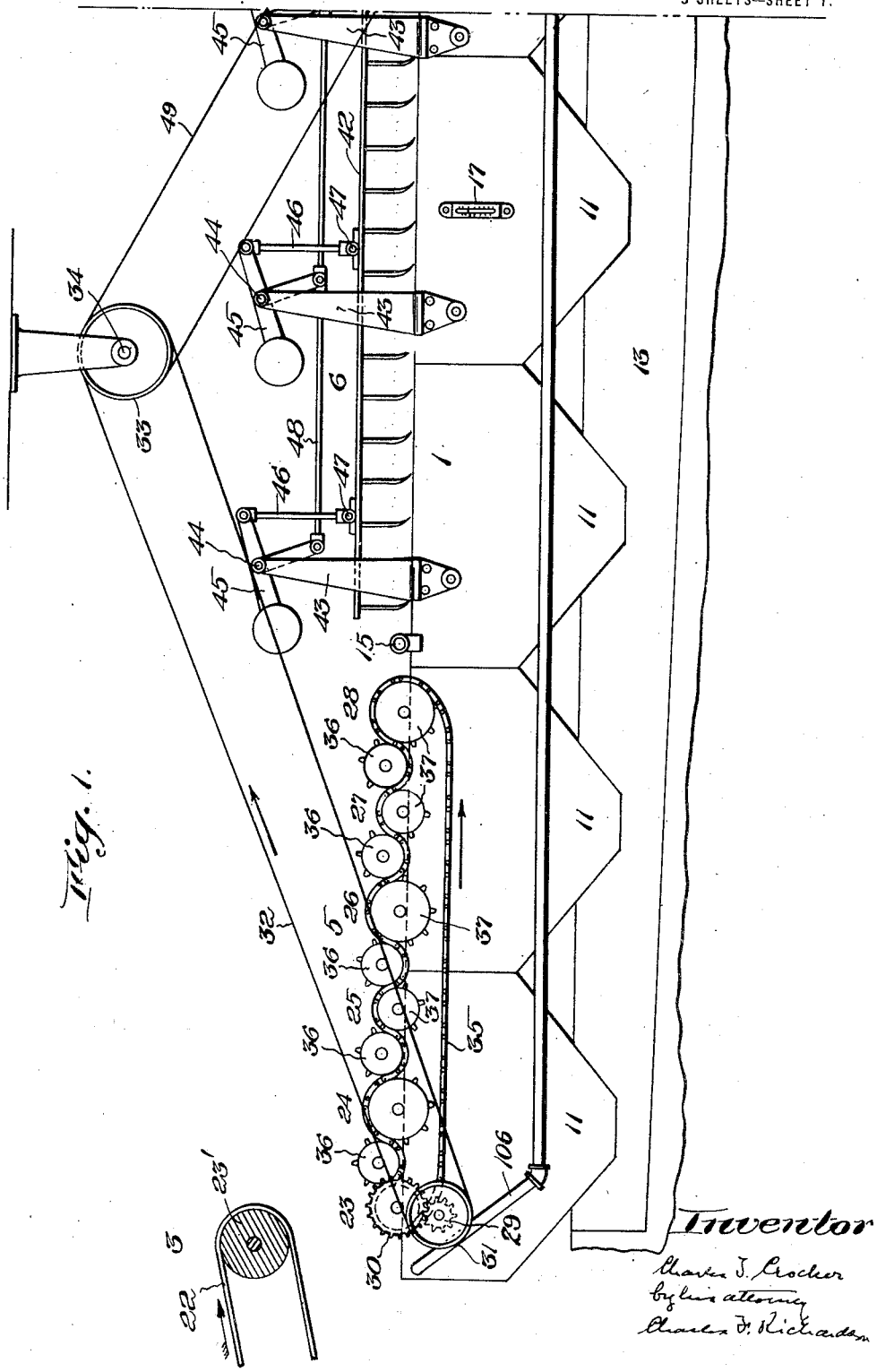

C. T. CROCKER.
ART OF PAPER MAKING.
APPLICATION FILED OCT. 21, 1918.
1,326,849.
Patented Dec. 30, 1919.
5 SHEETS—SHEET 2.
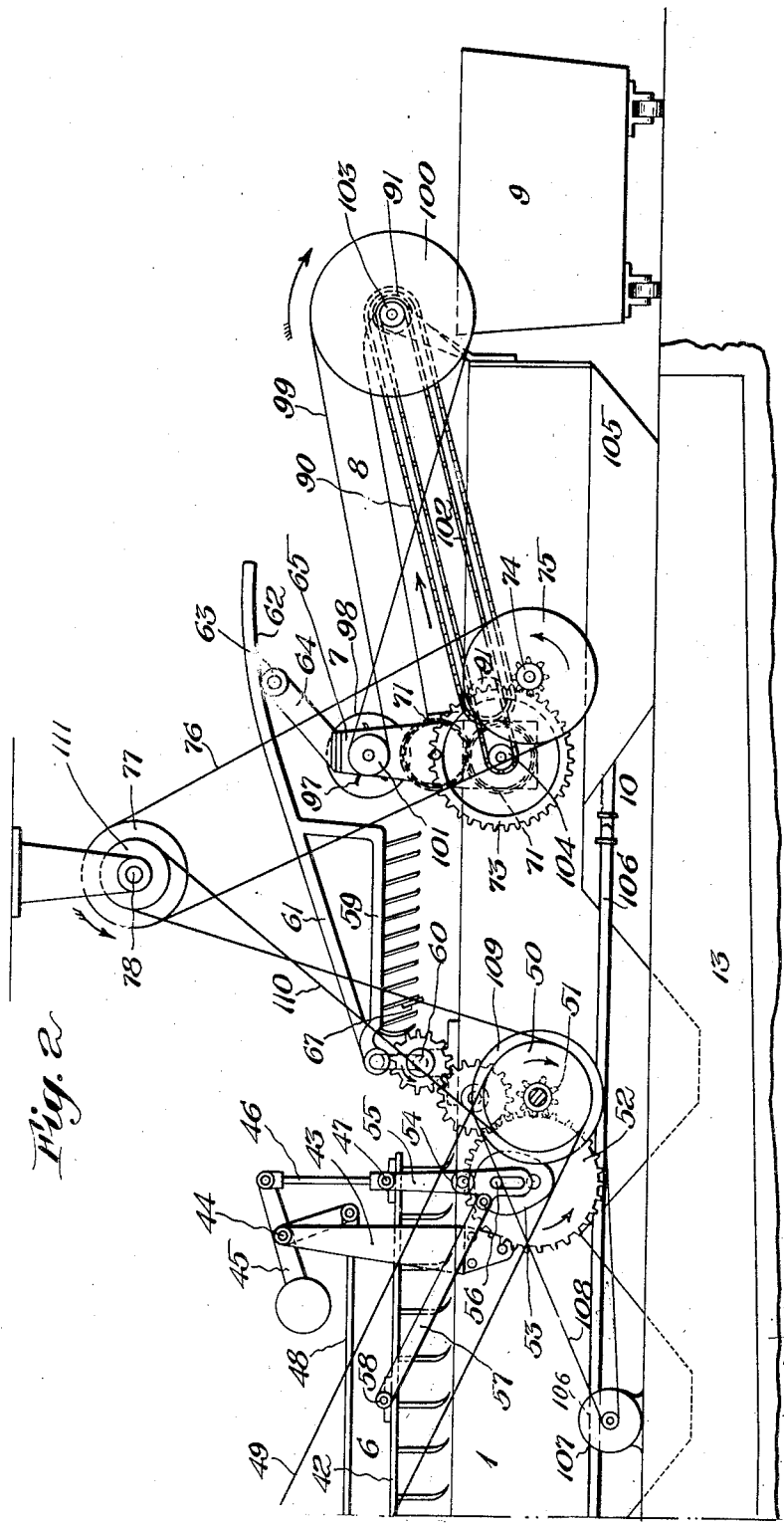

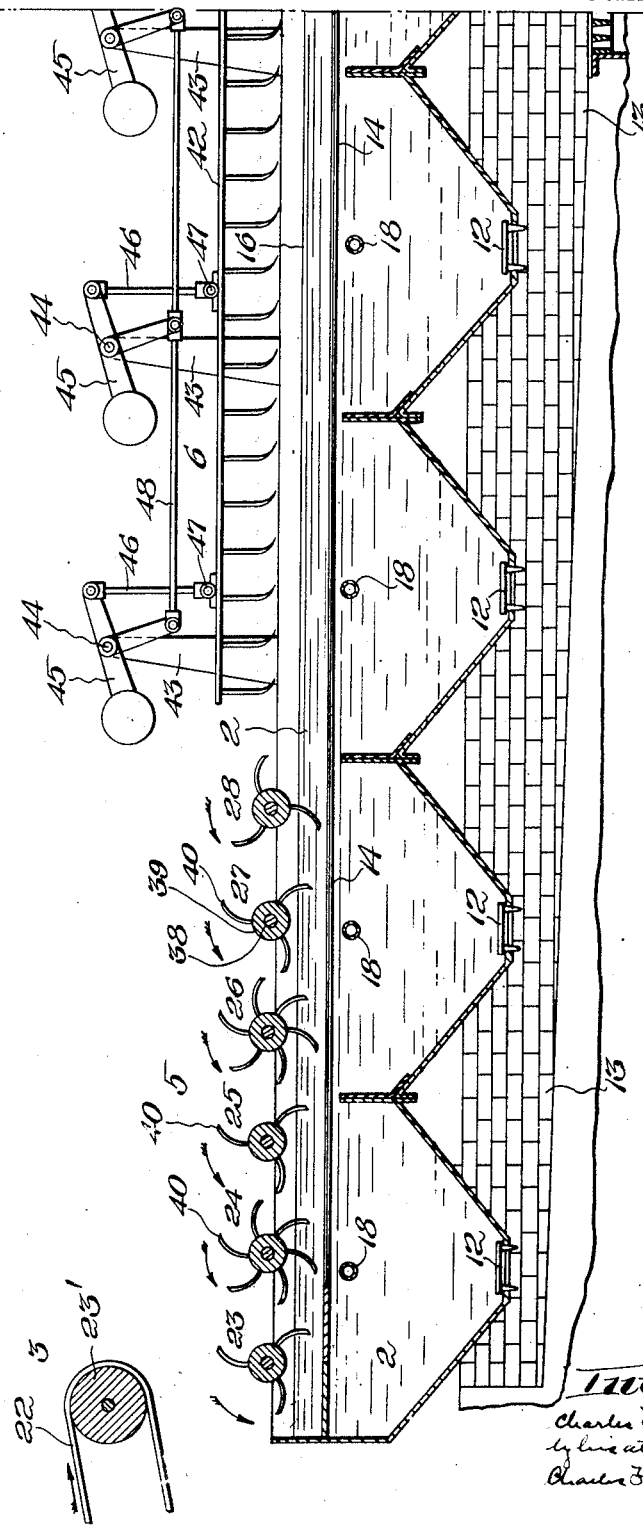

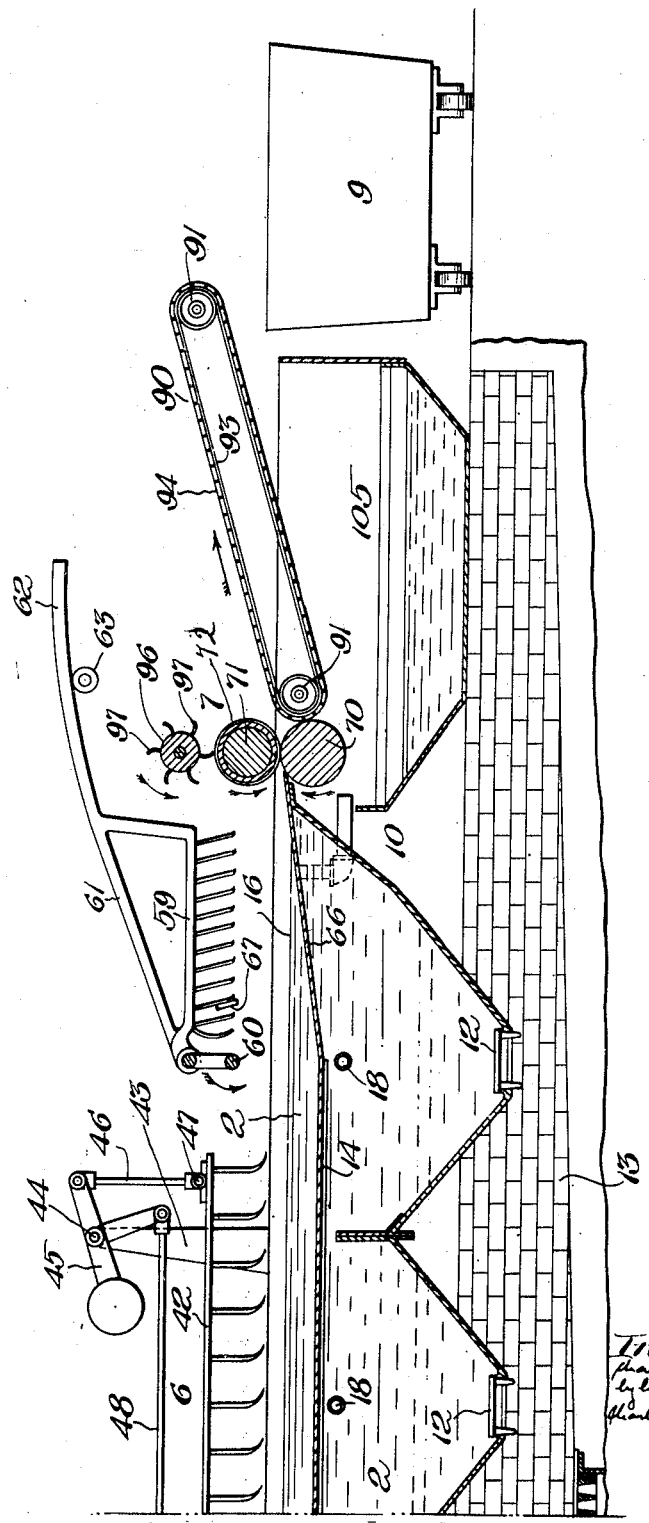

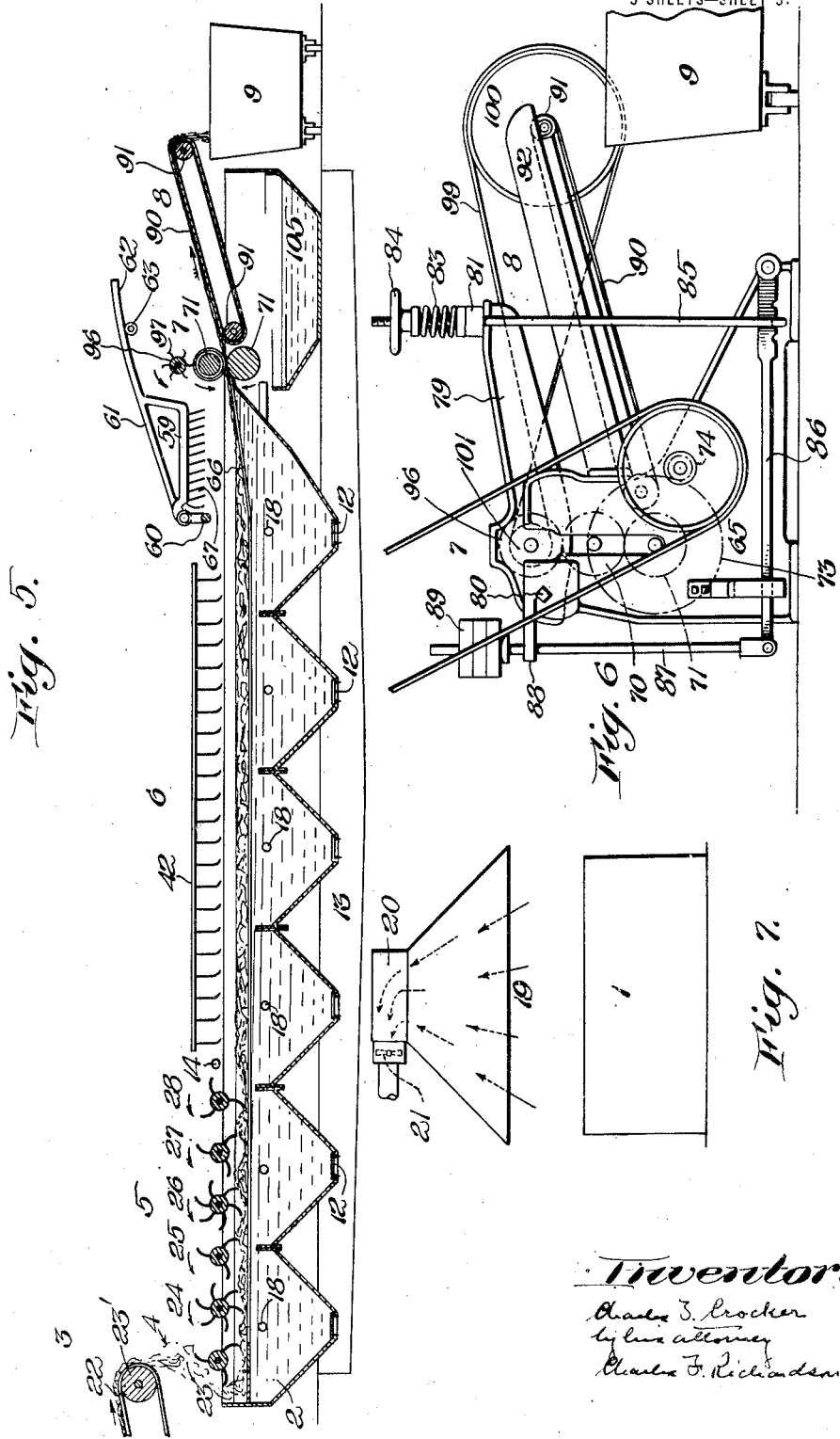

UNITED STATES PATENT OFFICE.

CHARLES T. CROCKER, OF FITCHBURG, MASSACHUSETTS.

ART OF PAPER-MAKING.

1,326,849.                    Specification of Letters Patent.        Patented Dec. 30, 1919.

Application filed October 21, 1918. Serial No. 259,064.

*To all whom it may concern:*

Be it known that I, CHARLES T. CROCKER, a citizen of the United States, residing at Fitchburg, in the county of Worcester and State of Massachusetts, have invented certain new and useful Improvements in the Art of Paper-Making, of which the following is a specification, reference being had therein to the accompanying drawings.

My invention relates to the art of paper-making, but is particularly applicable to that branch of it wherein waste paper stock is treated with an alkaline solution, for the purpose of cutting or removing ink or the like from the surface of the paper.

My invention resides both in a machine for, and in an improved process in, the treatment of a continuous stream of pieces of waste paper, with an alkaline solution.

In the old process, this stream of paper drops into a vat, and, at predetermined times, is sprayed from above, with a hot alkaline liquor, the pieces of paper becoming more or less soaked, or damp, and forming a soggy mass, increasing in size and being at a high temperature, say 180 degrees Fah.

When the vat is full, the bottom of the vat, which is upwardly movable, and upon which said mass of paper rests, is raised to the top of the vat, the hot mass is pitched off by hand, into small box cars. Later, these cars are manually pushed to washing machines into which the contents of the cars are dumped.

It is to be noted here that, while the paper pulp remains in a car, it is giving off heat, but that while that portion of the pulp exposed to the cooler atmosphere soon assumes the temperature of the surrounding air, the inside portion of the mass remains hot for a long time.

It is also to be observed that frequently some of the papers become so compact in relation to each other, that the alkaline solution does not thoroughly permeate them, and hence, the ink remains upon the paper, and tends to ink-spot and discolor the pulp in the washing machine.

It is still further to be noted that I have discovered that the sudden plunging of the hot mass of pulp into the cold water of the washing machine, tends to set the ink on the paper, and hence there is a resulting tendency toward discoloration of the pulp in the washing machine; but I have also discovered that if each piece of paper is thoroughly saturated with said alkaline liquor, and then allowed to drain and become thoroughly cool before being dumped into the cold water of the washing machine, the ink is more readily removed in the washing machine, and the consequent discoloration is done away with.

By the old method, the soaking and boiling of the papers requires a period of from six to twelve hours. The task of the attendant operatives is laborious, excessively hot, especially in removing the treated papers in the boiling vat. In fact, the men are frequently overcome, and it is a job at which a man cannot work without injury to his health. Also the cost of the steam needed, and the chemicals which cannot be reclaimed, is very substantial in amount.

Now while my process does not necessarily require machinery, a machine may be used; and when my process is carried out by a machine adapted by me, the construction and operation of which I will later describe, all of the above-mentioned objections are obviated; the length of time the papers are treated in the machine, is from three to five minutes; there is a great saving in labor, an increased production, an improved product, and a saving in the amount of steam and chemicals and in the cost thereof.

I desire, also, to call attention to the fact that pieces of metal such as nuts, washers, bolts, wire binders, eyelets, pins, or any hard substance, very frequently are fixed or contained in some of the waste papers; that it is most desirable that they be removed before the papers treated, are introduced into, say, the washing machine; and that I have found that if these pieces of paper with metal parts therein, are sufficiently agitated in the liquid, the metal parts and the paper weakened by such saturation, becomes separated, the metal parts settling to the bottom of the liquid, and remaining there until removed.

In the drawings illustrating the best operative structure now known and adapted by me for carrying out my said improved process of treating waste paper with an alkaline solution, in the art of paper-making.

Figures 1 and 2 show said structure in elevation, two sheets of drawings being required for the purpose; and Figs. 3 and 4 form a longitudinal section of the same; all of these figures being somewhat diagrammatic for the sake of simplicity and clearness;

Fig. 5 is the same as disclosed in Figs. 3 and 4, but reduced in scale, and showing the separate pieces of paper being subjected to my improved process;

Fig. 6 is an enlarged detail, in elevation, of the squeeze-rolls, and delivery apron;

Fig. 7 indicates a hood and ventilator over the structure, for the escape of fumes and steam arising from the structure.

This apparatus comprises a receptacle 1 for the reception of a suitable alkaline liquor 2; means 3 for feeding the paper 4 to the receptacle; submerging devices 5 and propelling devices 6 for carrying said paper through said liquor; squeezing and delivering mechanisms 7 and 8, whereby the treated paper is deprived of most of the liquor absorbed by it, is exposed to the cooler atmosphere and cooled, and then delivered to a movable car 9 to carry the cooled product to a washing-machine; and means for reclaiming the alkaline liquor.

The receptacle 1 consists of a long metal tank with a bottom made up of a series of bowls 11, Figs. 3 and 4, each, in form, an inverted truncated pyramid, and having a valve operated outlet 12 opening into a drain 13. A false perforated bottom 14 extends horizontally above these bowls, substantially the whole length of the receptacle.

The alkaline liquor 2 is prepared in a suitable tank, not shown, by the proper mixture of soda ash and hot water; and is allowed to flow into the receptacle through a valve-controlled pipe 15, Fig. 1, and stands at about the height indicated at 16, Figs. 3 and 4. In order to keep the liquor in the receptacle at the desired temperature, indicated by a thermometer 17, Fig. 1, steam is introduced into the receptacle through pipes opening therein, as at 18, Figs. 3 and 4.

Located above the receptacle 1, Fig. 7, is a large hood 19, provided with a ventilator 20 and an exhaust 21 for removing the steam and hot fumes constantly rising from the receptacle.

The papers to be treated are separated from each other as much as is possible, by employees, and then thrown on to a continuous feed-apron 22 running over suitable rolls 23', which are operated in a manner which is well understood and requires no further description; the delivery end of the feed-apron being over the receiving end of the receptacle.

Here are located the submerging devices 5 for completely immersing the pieces of paper delivered by the feed apron, and moving them along the false perforated bottom 14 to the propelling devices 6. These submerging devices consist of a series of six cylinders 23, 24, 25, 26, 27, and 28, the first of which, 23, Fig. 1, receives its power by means of gears 29, 30, operated by a pulley 31 and a belt 32 driven by a main-pulley 33 and shaft 34 above the receptacle. A chain 35 transmits the motion of rotation from the first to the other cylinders by means of idle sprocket wheels 36 and main sprocket wheels 37 connected with the cylinders, 23 to 28 inclusive. The main sprocket wheels vary in size, as indicated, hence the cylinders rotate at obviously different speeds.

Each cylinder, as 27, Fig. 3, comprises a shaft 38 and a plurality of hubs 39 secured to it, each of which has projecting therefrom radially, rearwardly curved vanes 40 for forcing the paper down into the liquor; the cylinder bearings being arranged along the top of the receptacle in such position that the ends of the curved vanes project down almost to the false perforated bottom 14. I have found that the number and arrangement of vanes indicated in the drawings operate successfully.

The papers 4, supplied from the feed-apron 22, fall on to the first cylinder 23, Fig. 3, the rotation of which forces each piece of paper down through the liquor 2, and on to the false bottom 14, and forward, and into position to be acted upon by each next succeeding cylinder, as 24, until they are seized by the teeth 41 of the propelling devices 6. These vanes 40 engage the papers, and positively force each piece under the surface of the liquor so that each piece is thoroughly immersed more than once, before it reaches the propelling devices. It will also be noted that these radial vanes tend to assist in causing currents of liquor in the receptacle.

It is at this stage of the process, that any pieces of metal affixed to the pieces of waste paper, become separated from the saturated papers, by the agitation brought about by the vanes 40; the metal pieces collecting under the submerging cylinders on the perforated bottom 14, and being frequently removed therefrom as by wood hand rake or shovel.

The propelling mechanism 6 comprises a rake 42 supported by uprights 43 on the top of the receptacle. These uprights are provided with shafts 44, having weighted arms 45 with depending links, to which the rake 42 is pivotally connected through shafts 47, transverse the rake. These arms 45 are connected by a longitudinal rod 48 so that there may be a parallel motion for raising and lowering one end of the rake in accordance with the motion of the other end.

To move the rake longitudinally, the following mechanism is used: Power is transmitted by the main power shaft 34 and belt 49, through a pulley 50 having a gear 51 meshing with a gear 52 on which is an eccentric 53 supporting a roller 54 that, in turn, is on a supporting bar 55, one end portion being pivoted to the rake 47, while the other end portion is slotted vertically for the reception of a crank-pin 56 on the gear wheel 52. The roller 54 and eccentric 53 are thus adapted to raise and lower the rake. To move it longitudinally, a connecting rod 57 is provided and pivotally connected to the rake and to the supporting rod 58. Obviously, by means of the eccentric and the crank, the connected mechanism will cause the entire rake and teeth to have an elliptical motion suitable for submerging, and moving the pieces of paper, while they are submerged, forward through the liquor and along the perforated bottom of the receptacle.

From the propelling mechanism 6, the saturating papers are seized by a vibrating rake 59, for the purpose of delivering them to the squeezing apparatus 7. This rake is operated by a crank-shaft 60, the frame 61 of the rake being extended and forming a cam surface 62 to move over a roller 63 on a support 64, fixed to the squeeze-roll standard 65. Extending upwardly from the false perforated bottom 14, is an inclined perforated surface 66, along which the teeth of the rake are adapted to work; the cam surface 62, position of the roller 63, and the length of crank 60, all being so designed that the teeth will take the desired path parallel with the inclined perforated bottom 66, during the upward and outward movement of the rake, and a horizontal rearward and downward motion during the return of the rake.

Across one row of teeth, there is a wooden blade 67, the bottom edge of which lies just below the plane of that row of teeth. I find that this prevents any possible damage being done by the teeth accidentally engaging the upwardly inclined surface 66 of the false bottom of the receptacle.

The power to rotate the crank-shaft 60 is derived through a train of gears 68, 69, driven by gear 52, which is driven by gear 51.

It will now be obvious that the teeth of the rake 59 thus hoe the saturated pieces of paper, and advance and deliver each of them to the squeeze-rolls 70, 71, mounted in the standard 65, Fig. 6.

In this way, it will also be plain that a machine is provided which will efficiently operate upon the separate pieces of paper, and subject them to a maximum degree of saturation.

The lower squeeze-roll 70 is made of metal, and by means of gears, not shown, drives the upper squeeze-roll 71, which is made of metal, wrapped with soft material 72 as roping or the like, and rests upon the lower roll, the roll 70 being driven by gear wheels 73, 74, the latter of which, in turn, is driven by a pulley 75 and belt 76 connecting it with a pulley 77 on a second main drive shaft 78.

That the desired pressure may be exerted upon the pieces of saturated paper, by the squeeze rolls 70, 71, Fig. 6, a pair of levers 79, operatively connected to the top squeeze roll 70, are pivoted at 80, to the standard 65, the end portions of said levers being connected together by a horizontal bar 81, through which extend downwardly a pair of pressure rods 85 having their upper end portions provided with springs 83 and adjusting wheels 84. Passing through openings in the bottom portion of these pressure rods 85, are a pair of weight-bearing arms 86 pivoted to the base of the standard 65; while to the free end portions of the weight-bearing arms are pivoted vertical weight-bearing rods 87 passing through guides 88 on the standard. Iron weight disks 89 may be supported upon these rods. Clearly, by means of these weighted levers, springs and adjusting wheels, the required pressure between the squeeze rolls may be obtained.

A delivery apron 90, Fig. 2, mounted upon two rolls 91 having suitable bearings 92 of the standard, receives upon its top portion, the squeezed pieces of paper from the squeeze-rolls 70, 71, and, after exposing them to the atmosphere, drops them into the car 9, as the apron returns under the rolls, toward the receptacle; the movement of the apron being due to a chain 102 and sprockets 103 and 104 driven by the gear 73.

This apron consists of three parallel but separate belts of canvas 93, to which are fixed transversely narrow wooden slats 94, there being between the slats open spaces, so that the air may freely circulate through the moving apron and about the moist pieces of paper 95 thereon, to cause evaporation, and thus quickly cool these hot but squeezed pieces of paper before they drop into the awaiting car 9.

Located above the top of squeeze-roll 71, is a doffer or stripping roll 96 having longitudinal strips 97, the free edges of which come into rotary contact with the surface of the top roll 71. This doffer roll has a balance wheel 98, and rotates faster than does the top squeeze roll 71, and in so doing creates cooling currents of air, engages and throws off from said roll, through said currents, and on to the top of the moving apron 91, any particle of warm paper that may have stuck to the surface of said roll; this rotation being brought about by a belt 99 connected with a pulley 100 on the delivery apron roll 91, and a pulley 101 on the doffer 96.

Below the squeeze-rolls and apron, is a reclaiming tank 105 into which the liquor from the squeeze rolls falls. A return pipe 106 leads from this tank to the paper-receiving end of the receptacle, Fig. 3, and through it the liquid in the tank is caused to flow, by means of a rotary pump 107, Fig. 2, driven by a belt 108 connected with a loose pulley 109, which in turn is driven by a belt 110 and a pulley 111 on the driving shaft 78.

I have now described my inventions and their operations; and I repeat that I have discovered a process and a machine whereby all of the objections arising from the use of the old soaking and boiling vat, such as the incomplete removal of ink from the surfaces of pieces of paper; the needless time of from six to twelve hours required in said soaking and boiling; the excessively hot, laborious and health-destroying tasks attending this whole process; the cost arising from needless waste of steam and loss of chemicals; are done away with, and in their place are substituted such benefits as a complete cutting of the ink on the pieces of paper, in from five to ten minutes; and a resulting white pulp in the washing-machine; a great saving in labor; a greatly improved atmosphere for the operatives; and enormously increased production of treated paper.

Having described the features of my invention and the best mode of carrying them into operation, and desiring to protect the same in the broadest manner legally possible,

What I claim is:

1. In the manufacture of paper, the process of subjecting a continuous stream of pieces of waste paper to the action of a hot alkaline solution, by causing each oncoming piece of paper, as nearly separate as is possible, to be submerged in, and moved through, said solution, to facilitate the exposure of its surfaces to the action of said solution, for the purpose of cutting, removing or neutralizing the ink or other material fixed to said surface, and by not only removing said pieces of paper from said solution, but also by depriving said pieces of paper of most of said solution, and exposing them to the air to cool, preparatory to being treated in a washing machine.

2. In the manufacture of paper, the process of subjecting a continuous stream of pieces of waste paper to the action of a hot alkaline solution, by causing each oncoming piece of paper, as nearly separate as is possible, to be submerged in, and moved through, said solution, to facilitate the exposure of its surfaces to the action of said solution, for the purpose of cutting, removing or neutralizing the ink or other material fixed to said surface, and by not only removing said pieces of paper from said solution, but also allowing them, substantially separately to drain, be exposed to the air, and cool, preparatory to being treated in a washing machine.

3. In the manufacture of paper, the process of subjecting a continuous stream of pieces of waste paper to the action of a hot alkaline solution, by causing each oncoming piece of paper, as nearly separate as is possible, to be submerged in, and move through, said solution, to facilitate the exposure of its surfaces to the action of said solution, for the purpose of cutting, removing or neutralizing the ink or other material fixed to said surface, and by not only removing said pieces of paper from said solution, but also allowing them, substantially separately to drain, be squeezed, exposed to the air and allowed to cool, preparatory to being treated in a washing machine.

4. In a machine for treating pieces of printed paper in the process of removing ink therefrom, squeeze-rolls to squeeze a hot alkaline solution from said pieces; a perforated traveling apron upon which said pieces are delivered whereby the evaporation of the moisture in said pieces is facilitated for the purpose of reducing the temperature of the same; a doffer roll for stripping and cooling any pieces of paper that may adhere to a squeeze-roll; and a balance wheel fixed to said doffer roll.

5. In a machine for treating pieces of printed paper in the process of removing ink therefrom, squeeze-rolls to squeeze a hot alkaline solution from said pieces; a perforated traveling apron upon which said pieces are delivered whereby the evaporation of the moisture in said pieces is facilitated for the purpose of reducing the temperature of the same; a doffer roll for stripping any pieces of paper that may adhere to a squeeze-roll; a balance wheel fixed to said doffer roll; and means whereby the speed of said doffer roll is faster than that of said squeeze-roll.

In testimony whereof I hereunto affix my signature.

CHARLES T. CROCKER.